US00RE34549E

United States Patent [19]

Sun

[11] E Patent Number: Re. 34,549

[45] Reissued Date of Patent: Feb. 22, 1994

[54] PURIFYING AIR CONDITIONER

[76] Inventor: Shin-Ching Sun, 3F., No. 32 Lane 132, Hu-Lin St., Taipei, Taiwan

[21] Appl. No.: 956,329

[22] Filed: Oct. 5, 1992

Related U.S. Patent Documents

Reissue of:

[64] Patent No.: 5,009,683
Issued: Apr. 23, 1991
Appl. No.: 383,481
Filed: Jul. 24, 1989

[51] Int. Cl.[5] ..... B03C 3/00

[52] U.S. Cl. ..... 96/66; 361/231; 96/77; 96/80

[58] Field of Search ..... 55/131, 136, 137, 138, 55/139, 151, 152; 361/230, 231, 235

[56] References Cited

U.S. PATENT DOCUMENTS

| | | | |
|---|---|---|---|
| 2,908,347 | 10/1959 | Roos | 55/131 |
| 3,727,380 | 4/1973 | Remick | 55/138 |
| 3,735,560 | 5/1973 | Wellman | 55/138 |
| 3,798,879 | 3/1974 | Schmidt-Burbach et al. | 55/138 |
| 3,816,980 | 6/1974 | Schwab | 55/136 |
| 3,910,778 | 10/1975 | Shahgholi et al. | 55/136 |
| 4,133,652 | 1/1979 | Ishikawa et al. | 55/138 |
| 4,133,653 | 1/1979 | Soltis | 55/138 |
| 4,523,463 | 6/1985 | Fathauer et al. | 55/138 |
| 4,643,745 | 2/1987 | Sakakibara et al. | 55/138 |
| 4,673,416 | 6/1987 | Sakakibara et al. | 55/139 |
| 4,689,056 | 8/1987 | Noguchi et al. | 55/152 |

*Primary Examiner*—Charles S. Bushey
*Attorney, Agent, or Firm*—T. D. Copeland

[57] ABSTRACT

An air conditioning system has a negative ion-filtering device in union for purifying function which comprises a PC board to produce negative ions, a high voltage lead, high voltage electric sheets, and a dust mesh, being positioned in the air blow direction path of the air conditioner for use after the temperature adjustment is made. Electric sheets which produce negative ions make the passing dust particles of the air carry negative charges and be sucked attached to the dust mesh producing positive ions, this way achieving purification of the air passing there-through.

4 Claims, 2 Drawing Sheets

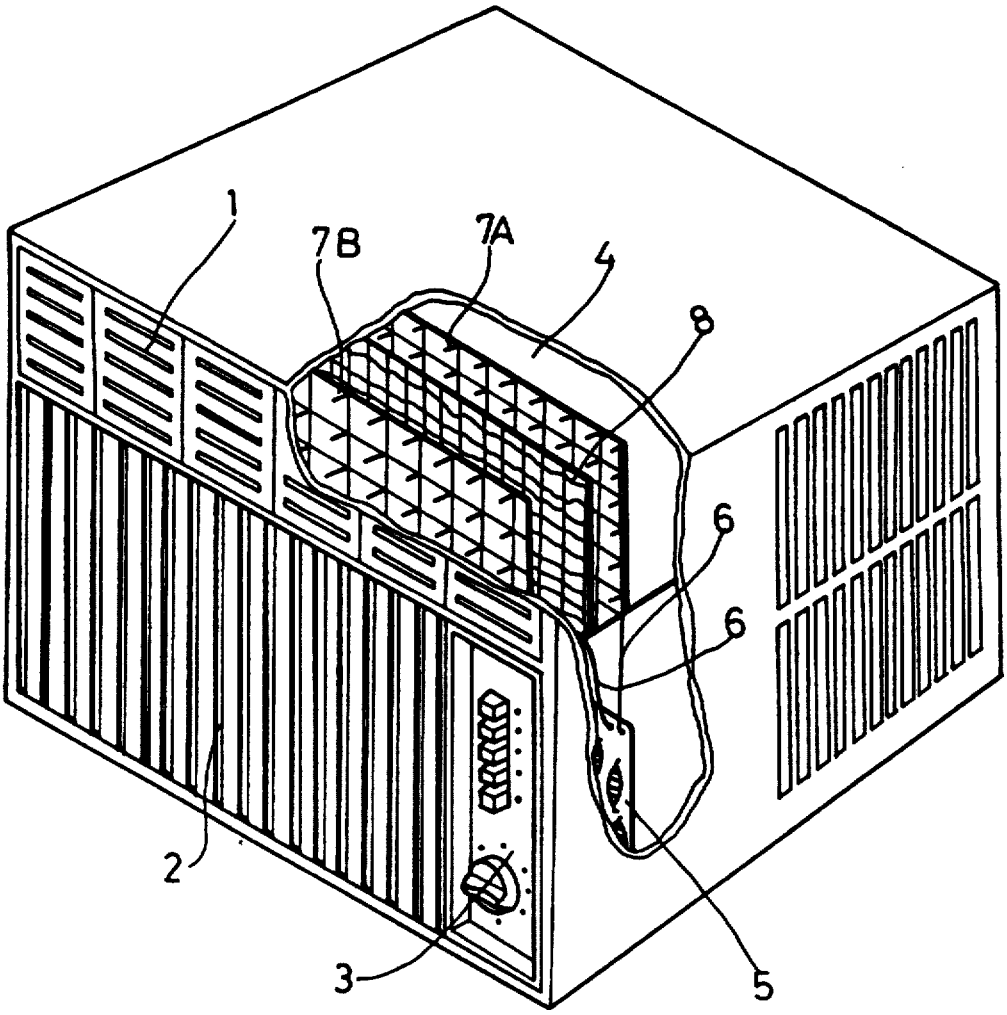
FIG. 2
FIG. 3
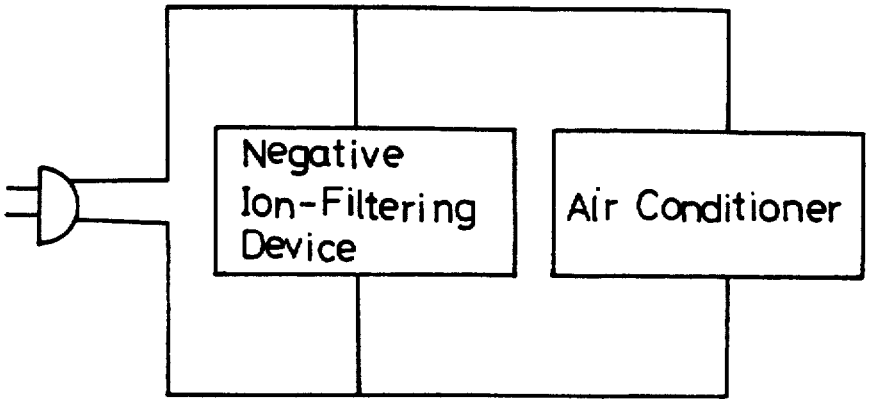

PURIFYING AIR CONDITIONER

Matter enclosed in heavy brackets [ ] appears in the original patent but forms no part of this reissue specification; matter printed in italics indicates the additions made by reissue.

FIELD OF THE INVENTION

The present invention is a purifying air conditioner which sucks passing dust particles from air being blown into a room, to raise the quality of air to an extent where chances of pulmonary disorders are significantly reduced.

BACKGROUND OF THE INVENTION

Since industrial development is a top pursuit in almost every country around the world, factory or plant establishments have been in rapid growth to produce merchandise for consumption to benefit a booming economy; however, we are paying dearly for that achievement by living in a seriously air polluted environment, one mainly brought by factory and vehicle exhaust gas, which threaten our health daily in a direct way. The seriousness of the pollution is seen upon wiping pure toilet paper across the nostrils. Such wiping usually turns the paper black. Though environmental protection or supervision units have done much in controlling excessive exhausts, the air quality continuously goes downgrade without any improvement, and this fact raises worries about health.

Presently, the commercially available air conditioner has merely contributed to temperature adjustment to comfort to human feeling, without effectively providing air quality improvement. Although, there is screening mesh provided in each air conditioner, its aperture is still too large to catch the submicro dust particles effectively, and even the latest type air conditioning advertisement called 'Three Machineries in One Body' merely functions to regulate the air's cold, warmth, and moisture aspects, without effectively controlling air quality.

OBJECT OF THE INVENTION

To overcome defects of the afore-said air conditioners, the present invention provides a purifying air conditioner which maintains the function of adjusting air temperature and moisture and, in addition, removes floating dust particles which are contained in the room to substantially purify the air.

SUMMARY OF THE INVENTION

A purifying air conditioner, on or behind air blow direction regulating grill of the air conditioner's front upper face, is provided with a negative ion-filtering device. In use of this air conditioner, any floating dust particles of the air before passing the air blow direction regulating grill are sucked attached to the high voltage electric sheets of said device; and passing the electric sheets providing negative ions to the air blow direction regulating grill, the blown air carries negative ions that shall add to the room's negative ions and, therefore, make the dust particles there of negative charges and fall attached to ground. In this way, the air sent from the purifying air conditioner is improved in quality and healthy for breathing.

BRIEF DESCRIPTION OF THE DRAWING

FIG. 2 is a locational profile view of the inventive air conditioner of FIG. 1.

FIG. 3 is a block diagram of the union of the negative ion-filtering device with an air conditioner.

SPECIFIC DESCRIPTION

Figure 1:
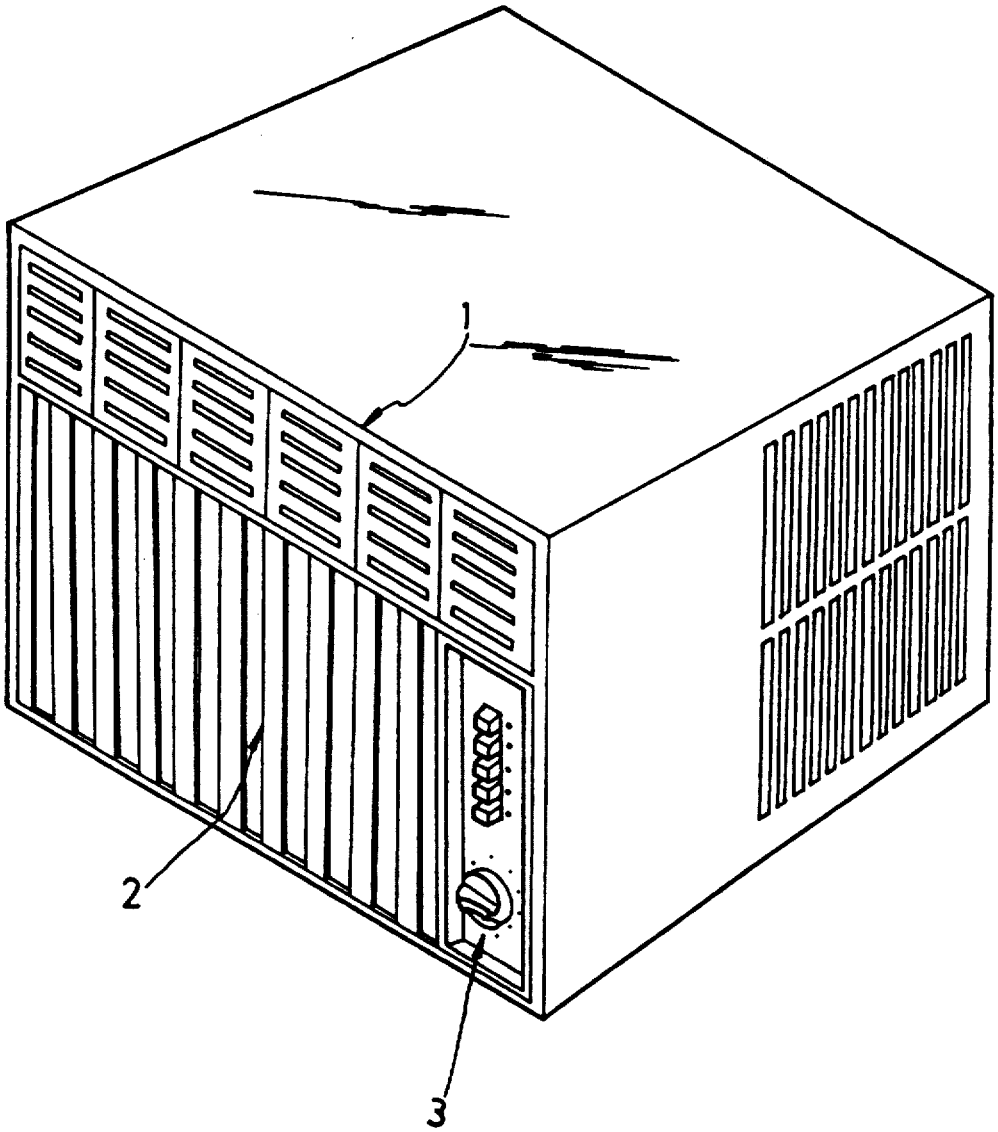
FIG. 1 is a perspective view of the purifying air conditioner same in appearance as other general air conditioners.

Referring now to FIG. 1, the purifying air conditioner is in appearance the same as general air conditioners, comprises an air blow direction regulating grill 1 at its upper front face, an air bleed grill 2 at its lower front face, and a control board 3, on the righthand of the lower front face. When selective switches on control board 3 are turned, the air conditioner's power source is conducted to supply electricity, and the air blown is regulated to a desired degree, while the power supply (as shown in FIG. 3) of the negative ion-filtering device 4 is conducted to start its function. The said device 4 comprises a PC board 5 to cause negative ions production, a high voltage lead 6, high electric sheets 7A and 7B, and a dust mesh 8, and is positioned behind the air blow direction regulating grill 1. High voltage electric sheets 7A and 7B produce negative ions simultaneously. The electric sheet 7A, producing negative ions, will make the floating dust particles contained in the air passing there have negative charges and be [sucked] *drawn* into attachment to dust where there is provided positive charges to achieve purification of the air passing there by. Dust mesh 8 is made of a sponge or dust-collecting mesh, secured in place before high voltage electric sheet 7A and is able to be taken away from a cleaning after a used time. Passing dust mesh 8, the purified cold (or warm) air is blown through high voltage electric sheet 7B to air blow direction regulating grill 1 to enter a room to provide addition of the negative ions, into the room air so that the floating dust particles carrying negative charges will fall by suction of the positive charges in attachment to the ground. *Since various modifications can be made in my invention as hereinabove described, and many apparently widely different embodiments of same made within the spirit and scope of the claims without departing from that spirit and scope, it is intended that all matter contained in the foregoing specification shall be interpreted as illustrative only and not in a limiting sense.*

I claim:

1. An improved air conditioner for purifying air by removing dust particles therefrom, comprising: a negative ion-filtering device disposed behind an air blow direction regulating grill of a front upper face of said air conditioner, said negative ion-filtering device comprising high voltage leads connecting a PC board to high voltage electric sheets in order to cause production of negative ions and a positive charge providing dust collecting mesh disposed between said high voltage electric sheets to cause floating dust particles in air passing after temperature adjustment to carry negative charges so that negative charged floating dust particles are sucked in attachment to said positive charged dust mesh, charged and any dust particles passing said positive charged dust mesh are negatively charged and allowed to fall in attachment to positive ground charges as the air exits the air blow regulating grill.

*2. An improved air conditioning system for purifying air by removing dust particles therefrom, comprising in combination: a negative ion-filtering device disposed within the air blow direction path of said air conditioning system after the air has been treated for changing its temperature, said negative ion-filtering device comprising high voltage leads connecting a PC board to high voltage electric sheets in order to cause production of negative ions and a positive charge providing dust collecting mesh disposed between said high voltage electric sheets to cause floating dust particles in air passing after temperature adjustment to carry negative charges so that negative charged floating dust particles are drawn into attachment to said positive charged dust mesh, and any dust particles passing said positive charged dust mesh are negatively charged and allowed to fall in attachment to positive ground charges as the air exits the air conditioning system.*

*3. An improved air conditioner as in claim 2, for purifying air by removing dust particles therefrom, comprising in combination: a negative ion-filtering device disposed within the air blow direction output of said air conditioner, said negative ion-filtering device comprising high voltage leads connecting a PC board to high voltage electric sheets in order to cause production of negative ions and a positive charge providing dust collecting mesh disposed between said high voltage electric sheets to cause floating dust particles in air passing after temperature adjustment to carry negative charges so that negative charged floating dust particles are drawn into attachment to said positive charged dust mesh, charged, and any dust particles passing said positive charged dust mesh are negatively charged and allowed to fall in attachment to positive ground charges as the air exits the air blow regulating grill.*

*4. An air conditioning system as in claim 2 for purifying air by removing dust particles therefrom, comprising in combination: a negative ion-filtering device disposed within the air blow direction path of said air treatment system after the air has been treated for changing its temperature, said negative ion-filtering device comprising high voltage leads connecting a PC board to high voltage electric sheets in order to cause production of negative ions and a positive charge providing dust collecting mesh disposed between said high voltage electric sheets to cause floating dust particles in air passing after temperature adjustment to carry negative charges so that negative charged floating dust particles are drawn into attachment to said positive charged dust mesh, and any dust particles passing said positive charged dust mesh are then negatively charged and allowed to fall in attachment to positive ground charges as the air exits the air conditioning system.*

* * * * *